United States Patent
Ahuja et al.

(10) Patent No.: US 10,423,000 B1
(45) Date of Patent: Sep. 24, 2019

(54) APPARATUSES, METHODS AND SYSTEMS FOR COMBINER OPTICAL COATING

(71) Applicant: Meta View, Inc., San Mateo, CA (US)

(72) Inventors: Ashish Ahuja, Mountain View, CA (US); Zhangyi Zhong, San Francisco, CA (US); Jackson Wilkins, Portola Valley, CA (US); Raymond Chun Hing Lo, Richmond Hill (CA); Alan Beltran, Woodside, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 15/332,951

(22) Filed: Oct. 24, 2016

Related U.S. Application Data

(60) Provisional application No. 62/245,906, filed on Oct. 23, 2015.

(51) Int. Cl.
*G02C 7/10* (2006.01)
*G02B 27/22* (2018.01)
*G02B 27/01* (2006.01)
*B29D 11/00* (2006.01)
*G02B 1/11* (2015.01)

(52) U.S. Cl.
CPC .... *G02B 27/2235* (2013.01); *B29D 11/00865* (2013.01); *G02B 27/0172* (2013.01); *G02B 1/11* (2013.01); *G02B 2027/0134* (2013.01)

(58) Field of Classification Search
CPC .................................. G02B 27/0172
USPC ........... 359/630, 464, 462; 348/60; 351/163, 351/144, 166, 159.62; 345/7
See application file for complete search history.

(56) References Cited

U.S. PATENT DOCUMENTS

| | | | | |
|---|---|---|---|---|
| 4,755,023 A * | 7/1988 | Evans | ..................... | A42B 3/042 2/424 |
| 5,309,169 A * | 5/1994 | Lippert | .............. | G02B 27/0172 345/7 |
| 5,574,517 A * | 11/1996 | Pang | ...................... | G02B 5/285 351/44 |
| 6,501,602 B2 * | 12/2002 | Togino | ............... | G02B 17/0848 359/631 |
| 7,164,535 B2 * | 1/2007 | Hall | ........................ | G02B 5/285 359/581 |
| 7,278,738 B2 * | 10/2007 | Hsu | ......................... | G02B 1/11 351/159.62 |
| 9,335,541 B2 * | 5/2016 | Silverstein | ......... | G02B 27/2207 |

* cited by examiner

*Primary Examiner* — Audrey Y Chang
(74) *Attorney, Agent, or Firm* — Andrew Bodendorf

(57) ABSTRACT

Aspects of the disclosed apparatuses, methods and systems provide coating profiles for optics of a stereoscopic vision system configured to reduce unwanted light. Offset masks are used to provide gradient coating thicknesses. A method of forming the optical system with coatings and mechanical holder used during the method also are provided.

15 Claims, 20 Drawing Sheets

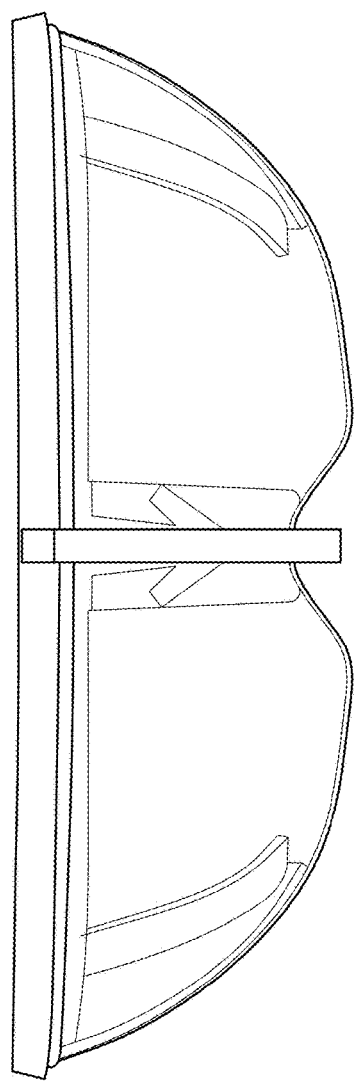

APPARATUSES, METHODS AND SYSTEMS FOR COMBINER OPTICAL COATING

CROSS-REFERENCE TO RELATED APPLICATIONS

This application claims the benefit under 35 U.S.C. § 119(e) of U.S. Provisional Application No. 62/245,906, titled "APPARATUSES, METHODS AND SYSTEMS FOR COMBINER OPTICAL COATING" filed on Oct. 23, 2015 in the U.S. Patent and Trademark Office, which is herein expressly incorporated by reference in its entirety for all purposes.

BACKGROUND

The interest in wearable technology has grown considerably over the last decade. For example, augmented reality (AR) displays that may be worn by a user to present the user with a synthetic image overlaying a direct view of the environment. In addition, wearable virtual reality (VR) displays present a virtual image to provide the user with a virtual environment. Many companies are attempting to transfer AR and VR technology from its early military applications to more widely available consumer electronics. One example of such wearable technology is a stereoscopic vision system. The stereoscopic vision system typically includes a display component and optics working in combination to provide a user with the synthetic or virtual image.

SUMMARY

Aspects of the disclosed apparatuses, methods and systems provide coating profiles for optics of a stereoscopic vision system configured to reduce unwanted light or crosstalk between regions. Offset masks are used to provide gradient coating thicknesses of the optics. A method of forming the optical system with coatings and mechanical holder used during the method also are provided.

In one general aspect, an optics system of a stereoscopic vision system includes a substrate including an interior surface and an exterior surface; an anti-reflective coating formed on the interior surface of the substrate; and a semi-reflective or reflective coating formed on the anti-reflective coating in two separated regions of the interior surface of the substrate.

The substrate may include a nasal region positioned between two eye image regions and the semi-reflective or reflective coating may be formed on the antireflective coating covering the two eye image regions.

The substrate may include two temporal regions and each temporal region may bound one edge of the eye image regions.

The semi-reflective or reflective coating may be further formed from edges of each eye image region including a first edge extending into the nasal region and a second edge extending into the temporal regions; and the thickness of the semi-reflective or reflective coating may be substantially constant over the entire eye image region and gradually decreasing at a gradient at each of the first and second edges.

In another general aspect, an optics system of a stereoscopic vision system includes: a substrate including an interior surface and an exterior surface; a semi-reflective or reflective coating formed on the interior surface of the substrate; and a strip of anti-reflective coating formed along a center region of the semi-reflective or reflective coating.

The substrate may include a nasal region and the anti-reflective coating may be formed over the nasal region on the anti-reflective coating to divide the remaining exposed semi-reflective into two eye image regions.

The semi-reflective or reflective coating may be further formed from an edge of each eye image region extending into the temporal regions; and the thickness of the semi-reflective or reflective coating may be substantially constant over the entire eye image region and gradually decreases at a gradient at each of the edges.

In another general aspect, an optics system for a stereoscopic vision system includes: a substrate including an interior surface and an exterior surface including two separated eye image regions bounding an central nasal region; and a semi-reflective or reflective coating formed on the interior surface of the substrate in the two separated eye image regions.

The optics system also may include an antireflective coating formed on the interior surface of the substrate between the two eye image regions.

The substrate may include two temporal regions and each temporal region may bound one edge of the eye image regions.

The semi-reflective or reflective coating may further be formed from edges of each eye image region including a first edge extending into the nasal region and a second edge extending into the temporal regions; and the thickness of the semi-reflective or reflective coating may be substantially constant over the entire eye image regions and gradually decreases at a gradient at each of the first and second edges.

A method of making the optics systems described above may include: providing a mask offset from the interior surface of a substrate positioned by a holder relative to each edge of a boundary between the nasal region and each eye image region; placing the substrate in the holder; placing the holder, substrate and offset mask in a deposition chamber; placing a source of the semi-reflective or reflective coating for deposition onto the substrate in the deposition chamber; and forming the semi-reflective or reflective coating on the substrate.

The method also may include, prior to placing the holder, substrate and mask in a deposition chamber; the providing a mask offset from the interior surface of the substrate positioned by the holder relative to a second edge of a boundary between a temporal region and each eye image region.

In yet another general aspect, a mechanical holder for an optical substrate includes: a member for seating the substrate; a first mask connected to the member corresponding to a central nasal region of the substrate when the substrate is seated in the holder, the first mask offset at a distance from a seated substrate, the distance corresponding to desired a gradient coating profile for the central nasal region.

The mechanical holder also may include a second mask connected to the member corresponding to a temporal region of the substrate when the substrate is seated in the holder, the second mask may be offset at a distance from a seated substrate, the distance corresponding to desired a gradient coating profile for the temporal region.

The mechanical holder also may include a third mask connected to the member corresponding to another temporal region of the substrate when the substrate is seated in the holder, the third mask may be offset at a distance from a seated substrate, the distance corresponding to desired a gradient coating profile for the other temporal region.

The details of various embodiments are set forth in the accompanying drawings and the description below. Other features and advantages will be apparent from the following description, the drawings, and the claims.

BRIEF DESCRIPTION OF DRAWINGS

The following description illustrates aspects of embodiments of the disclosed apparatuses, methods and systems in more detail, by way of examples which are intended to be non-limiting and illustrative with reference to the accompanying drawings, in which:

FIGS. 7A and 7B are photographs of one example of masks attached to a stereoscopic system by a mechanical holder;

DETAILED DESCRIPTION

Figure 1:
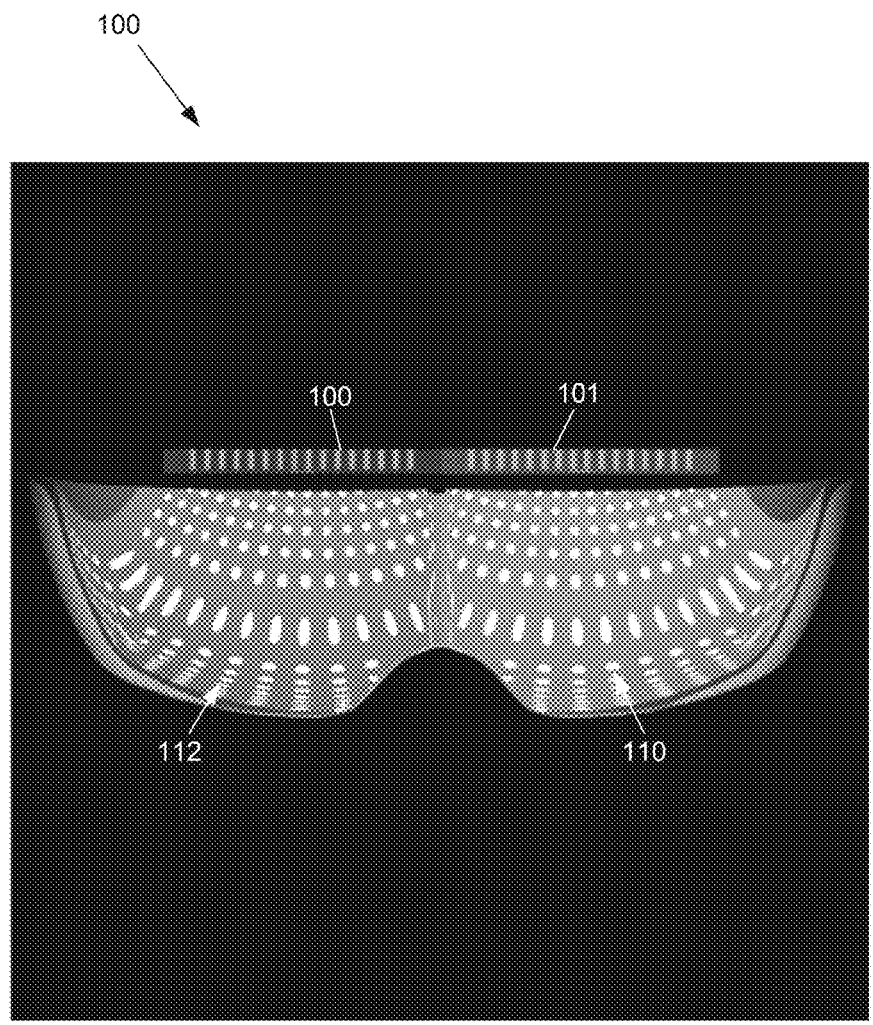
FIG. 1 illustrates an example of desired field of view of a stereoscopic system.

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims which expressly states otherwise. It is understood that "at least one" is equivalent to "a".

The aspects (examples, alterations, modifications, options, variations, embodiments and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments which are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

Overview

Figure 2:
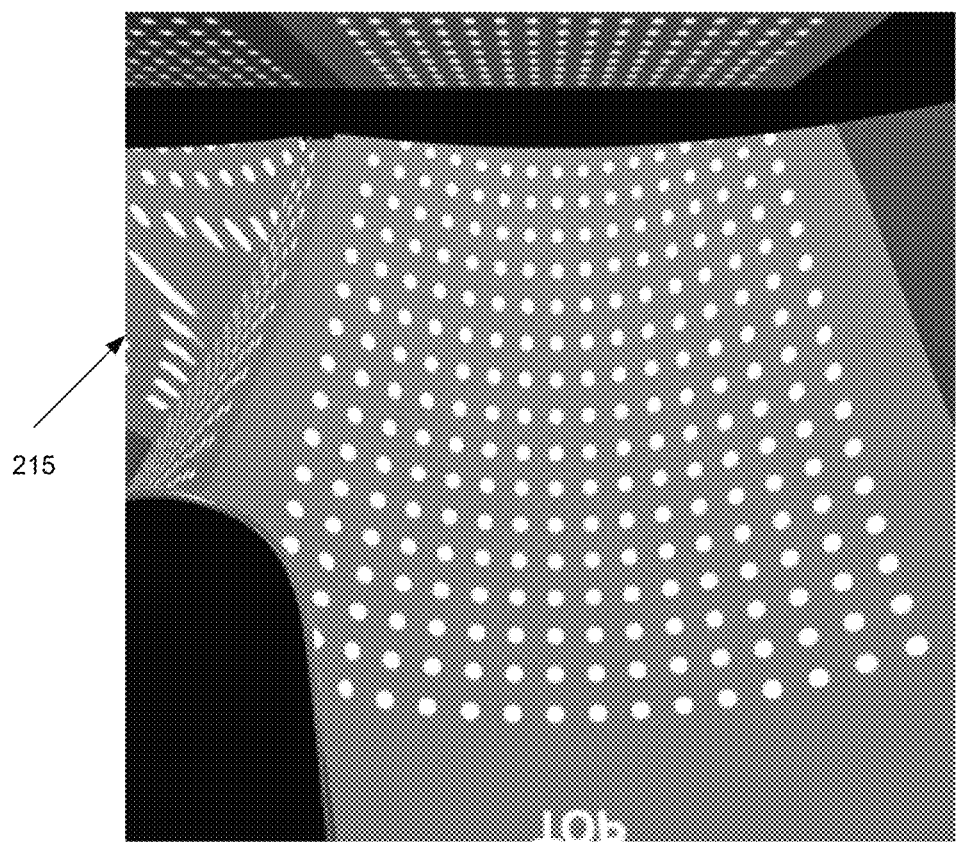
FIG. 2 shows an example of a view from one eye of a stereoscopic system.
Figure 3:
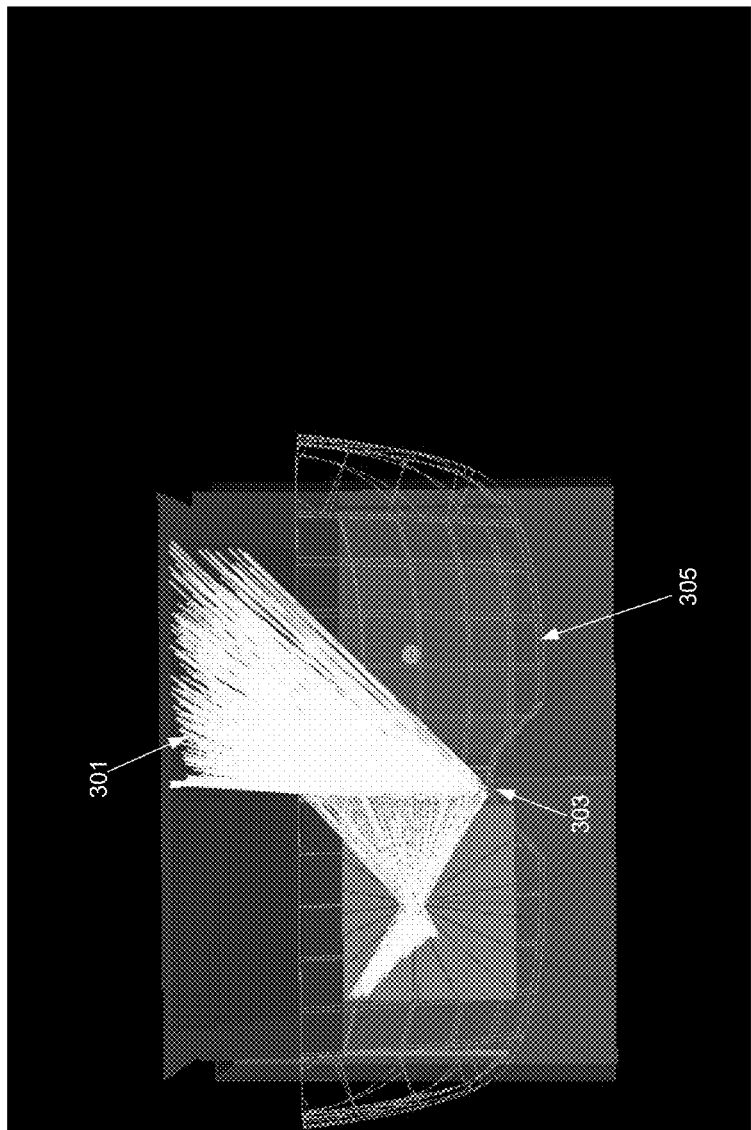
FIG. 3 schematically illustrates an example of reflection of unwanted light in a stereoscopic system.

A stereoscopic system is designed to present a distinct image to each eye of a user of the system. In one example, a stereoscopic system may include a display arranged to illuminate an optics system. The optics system may be semitransparent to provide the user with a view of their surrounding environment and semi-reflective to reflect light from the display into a user's eye. One example of an optics system for a stereoscopic system is a combiner-imager, such as a visor. The display is divided into two regions. One region provides an image intended for the left eye, and the other region provides an image intended for the right eye. The optics system 100, such as a visor, is positioned relative to the display regions 101, 102 to reflect the image to the corresponding eye of the user. Ideally, the light provided from each region 101, 102 should only be seen by the corresponding eye, for example, as shown in FIG. 1 by the red region 110 (for the right eye) and blue region 112 (for the left eye). For example, the red region 101 of the display is intended for the user's right eye, and the blue region 102 is intended for the user's left eye. However, as shown in the example of FIG. 2, when the optic system 100 is viewed from the user's right eye, a portion 215 of the blue viewing area may be seen. The same is true for the user's left eye (not shown). FIG. 3 illustrates an example of a stereoscopic system 300 showing light 301 reflected off of the nasal region 303 of a combiner 305. The reflected light (intended for the left eye) allows the right eye to see a portion of the left eye image. As a result, this crosstalk between the two regions corrupts of the final fused image as perceived by the user of the stereoscopic system.

In addition, stray light reflected from the combiner flange also is undesirable and can lead to image degradation. In order to prevent unwanted crosstalk between the regions and eliminate peripheral reflection, a novel coating process and system is provided to prevent or otherwise mitigate crosstalk while minimizing any peripheral reflections. In addition, the process minimizes any noticeable discrete change in the coating of a surface of the visor. A system and components aiding the masking and the coating process also are provided.

As a result, the coating process and system provide a stereoscopic system having two coherent, isolated images that are presented to each eye using an optics system, such as a combiner imager that is comprised of optical and non-optical areas. In one example, transitions from optical to non-optical areas are smoothed by defining a gradient (as opposed to a step) reflective thin-film profile on the concave portion of the visor.

General Description

In general, the following description provides examples of eliminating or mitigating unwanted reflections and/or cross talk from an optics system, such as a visor in a stereoscopic system. Various examples of thin-film process flows and masks are used to achieve these results, as explained in further detail below.

In order to prevent unwanted reflection of light from the optics system, four different coating profiles of thin films that are deposited on a substrate of the optics system are provided in FIG. 4. As shown in FIG. 4, a combiner imager substrate 401, such as, for example, a visor is divided into five regions: a nasal region 410, two eye image or aperture regions 412, and two temporal regions 414. For convenience, the substrate 401 and coatings are depicted as flat in FIG. 4; however, ones skilled in the art will appreciate that the optics may be curved, for example, having an inner concave surface and an outer convex surface, as shown in some of the examples provided below.

Figure 4A:
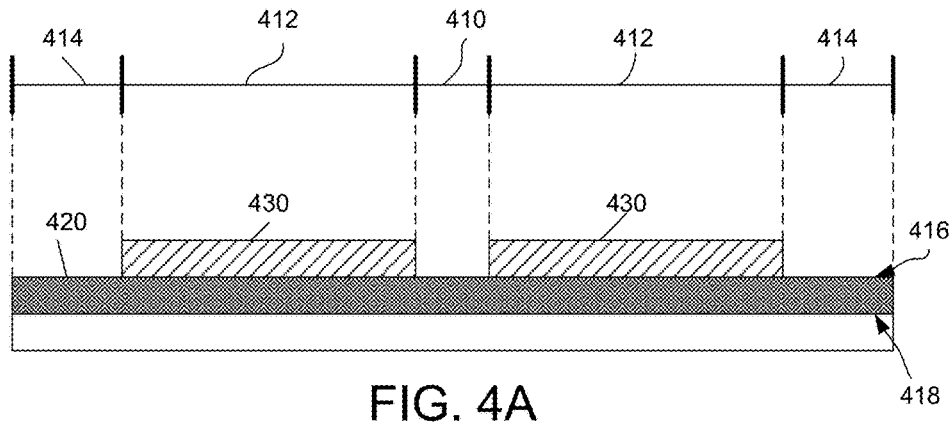
FIGS. 4A, 4B, 4C, and 4D show examples of optical coating profiles for a stereoscopic system.

FIG. 4A shows an example of a coating profile for an optics system. The optics system is constructed, for example, from a polycarbonate substrate 401 having an interior surface 416 and an exterior surface 418. As shown, an anti-reflective (AR) coating 420 is provided across approximately the entire interior concave surface of the combiner covering the nasal region 410, two eye image regions 412, and at least a portion of the temporal regions 414. In addition, a reflective coating (R) or semi reflective (SR) coating 430 is deposited on the AR coating to covering the eye image regions 412.

Figure 4B:
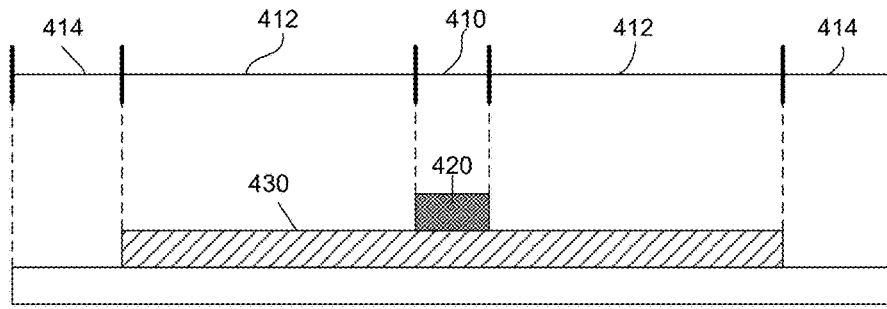

FIG. 4B shows another example of a coating profile for an optics system. In this example, an R or SR coating 430 is deposited on both eye image regions 412 and nasal region 410 of the interior concave surface of the substrate 401 of the combiner. An AR coating 420 is provided on the nasal region 410 on the R or SR coating.

Figure 4C:
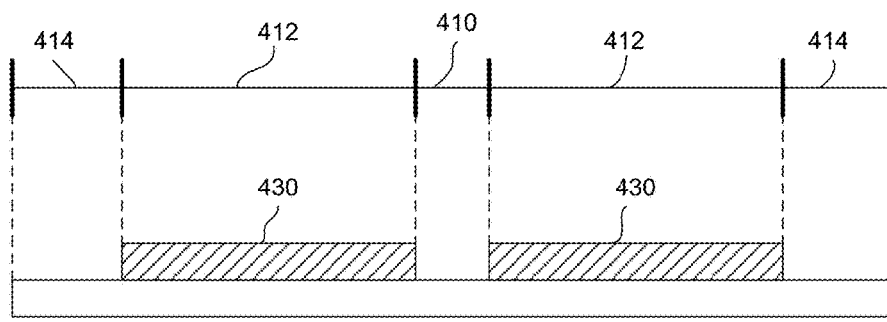

FIG. 4C shows yet another example of a coating profile for an optics system. In this example, an R or SR coating 430 is deposited on both eye image regions of the interior concave surface of the substrate 401 of the combiner. In this coating profile, no AR coating is provided.

Figure 4D:
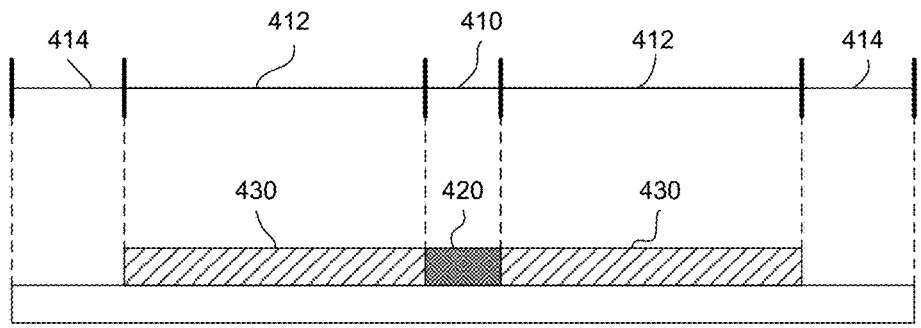
Figure 4E:
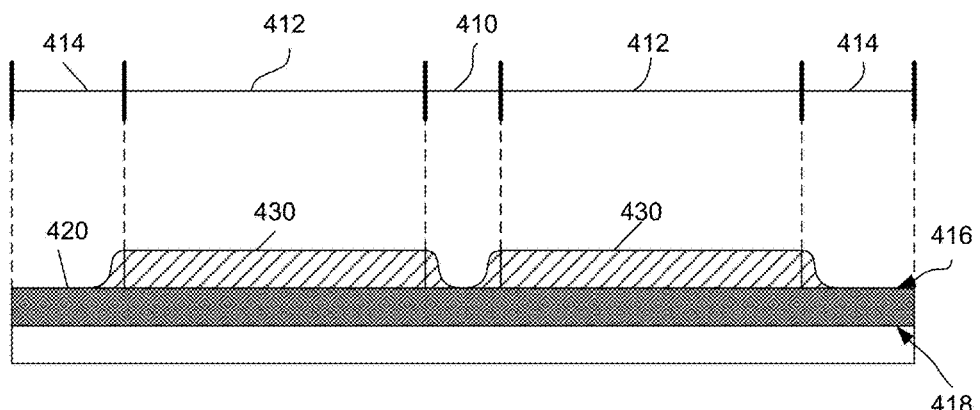
FIGS. 4E, 4F, 4G, 4H, 4I show examples of optical coating profiles with gradients for a stereoscopic system.
Figure 4F:
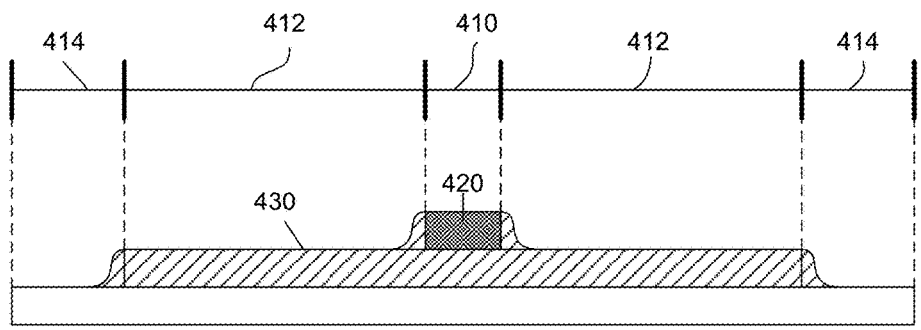

FIG. 4D shows yet another example of a coating profile for an optics system. In this example, an R or SR coating 430 is deposited on both eye image regions of the interior concave surface of the substrate 401 of the combiner. An AR coating 420 is provided on the substrate 401 on the nasal region 410 between the R or SR coating of the eye image regions 412.

Although FIGS. 4A-4D show the coating layers as uniformly thick, non-uniform coatings having various depths may also be provided. In one example, a gradient profile of varying thickness at the one or more boundaries of the regions may be used. The gradient may be provided, for example, through use of a corresponding offset mask during the thin film coating process. Some examples of an offset mask are described below. The falloff or gradient may be, for example, linear, sigmoidal, Gaussian, or exponentially decaying depending on the type of mask, coating, and/or deposition process used to form the coating on a surface. The fading profile may be desirable, for example, from a design point or aesthetic point of view. For example, a gradual fading profile of the SR coating of the eye image region may be used in order to eliminate or minimize any noticeable discrete change in the coating by anyone viewing the combiner-imager from the exterior. Some examples of coating profiles with gradients are provided in FIGS. 4E-4I, which roughly correspond to the profiles in FIGS. 4A-4D, respectively.

Figure 4G:
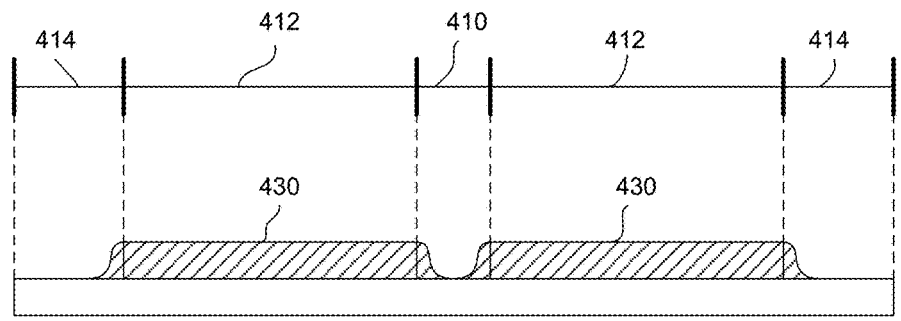
Figure 4H:
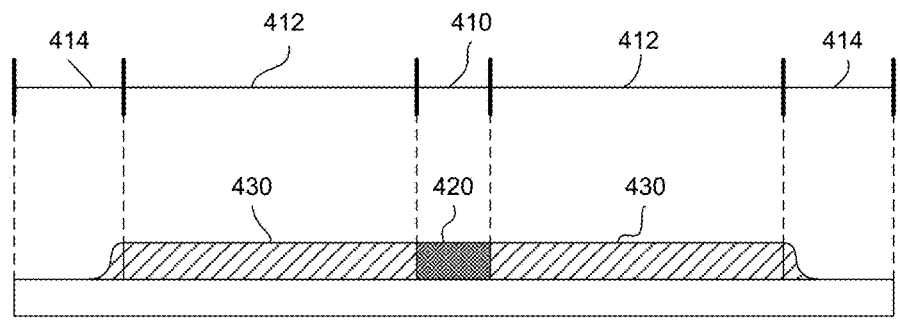
Figure 4I:
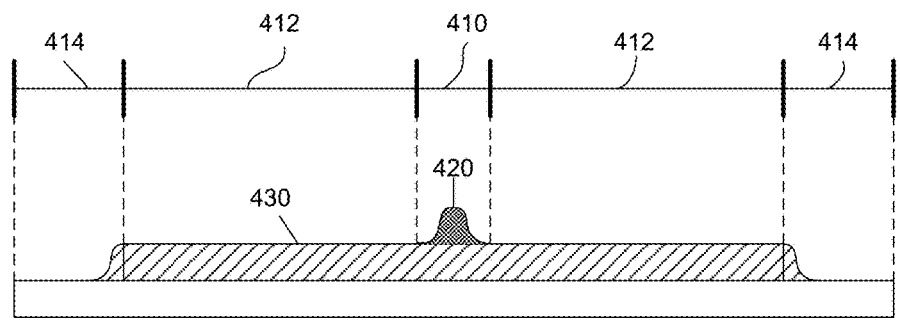
Figure 5:
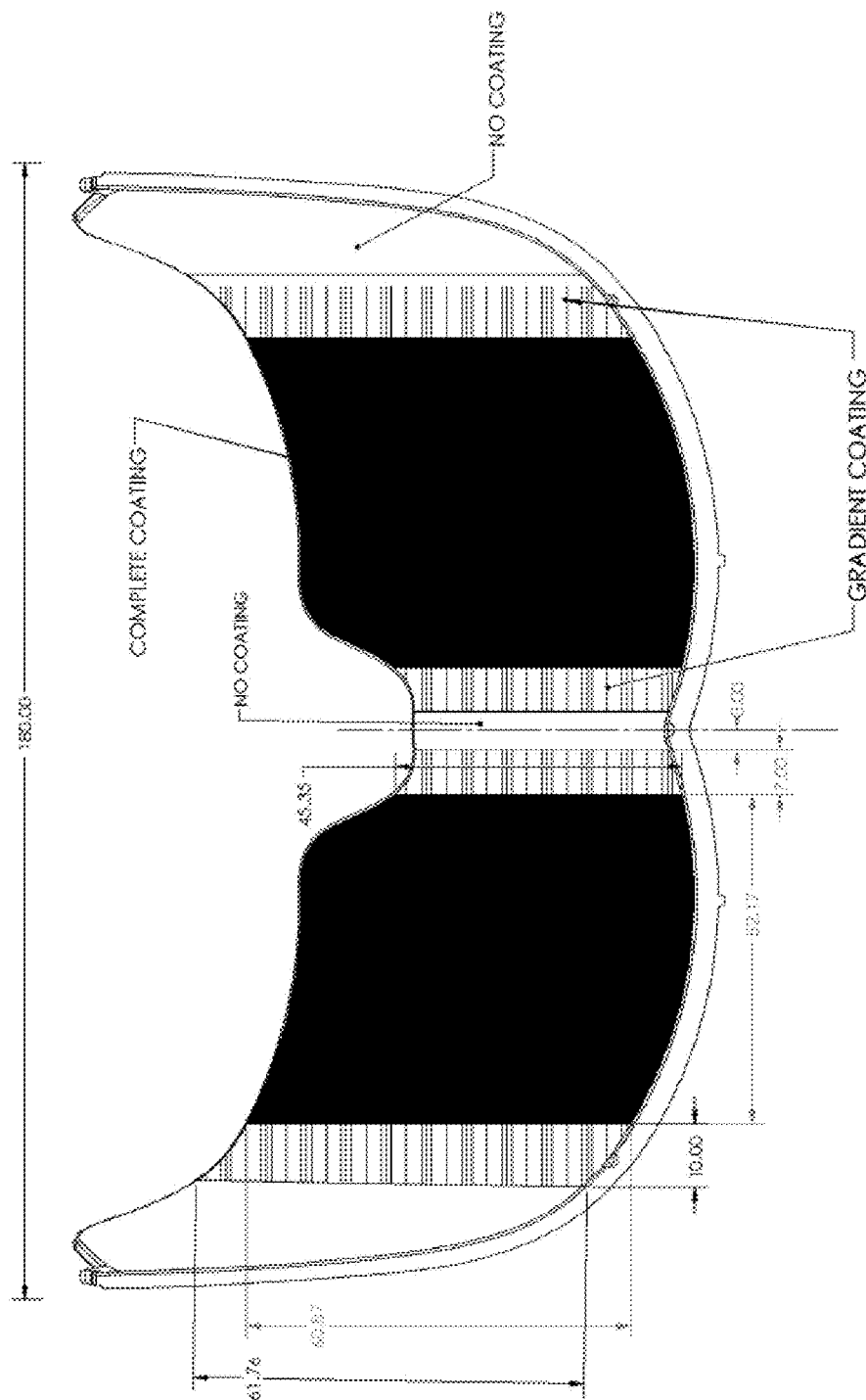
FIG. 5 shows an example of a gradient thin film for a stereoscopic system.
Figure 6A:
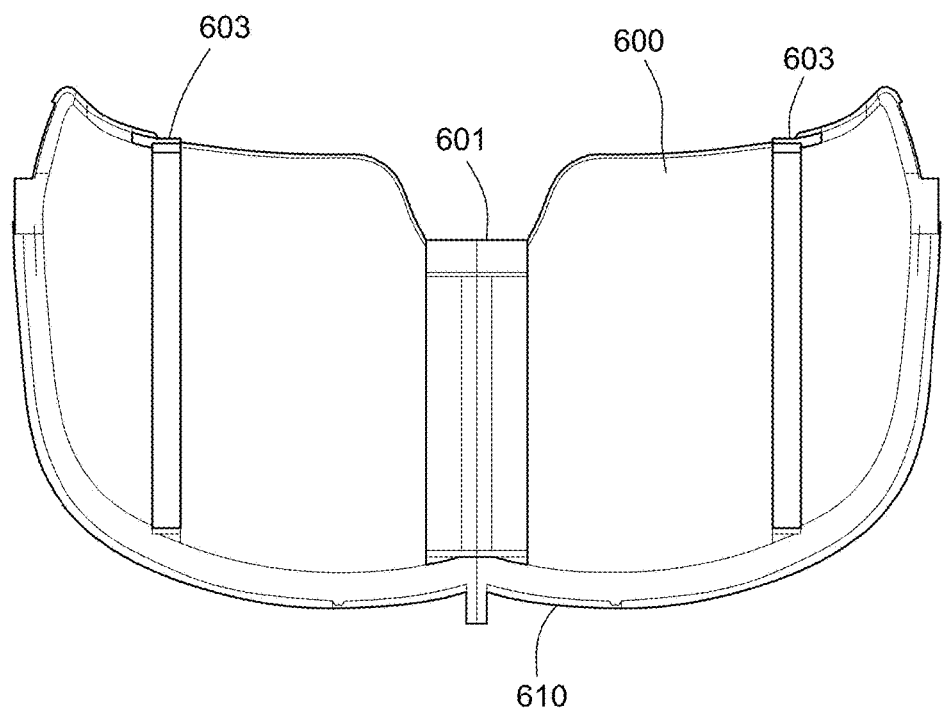
FIGS. 6A, 6B, 6C, and 6D show various perspective views of an example of an optical substrate, masks, and holder for deposition of films on the substrate to form a stereoscopic system.
Figure 6B:
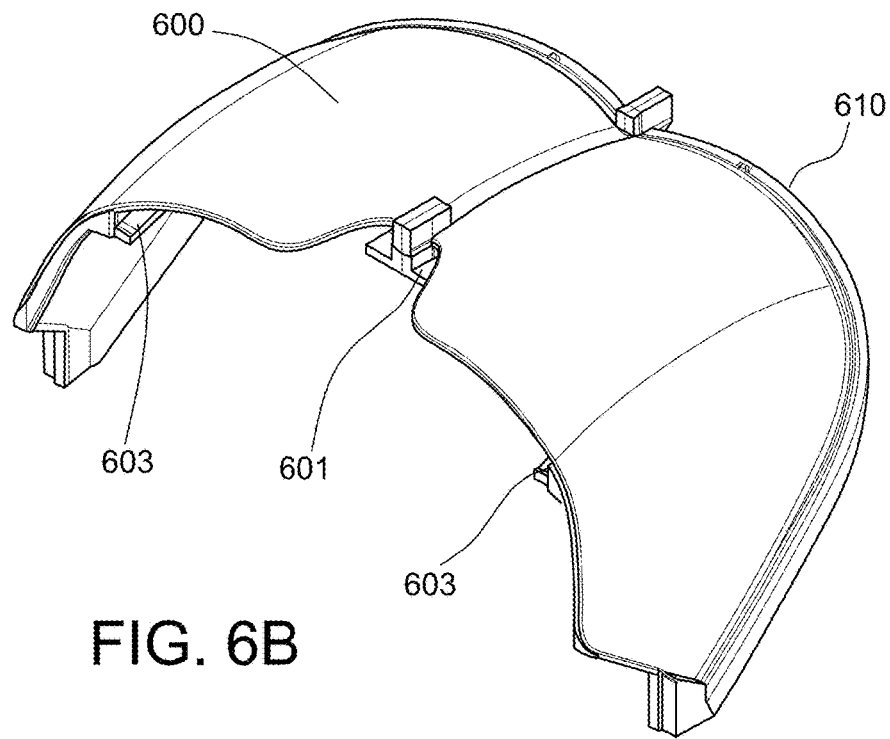
Figure 6C:
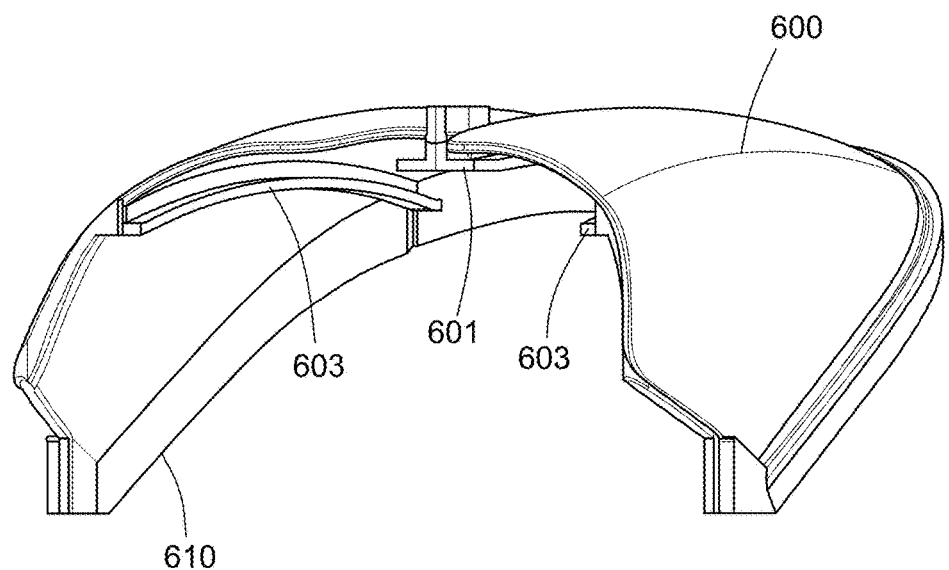
Figure 6D:
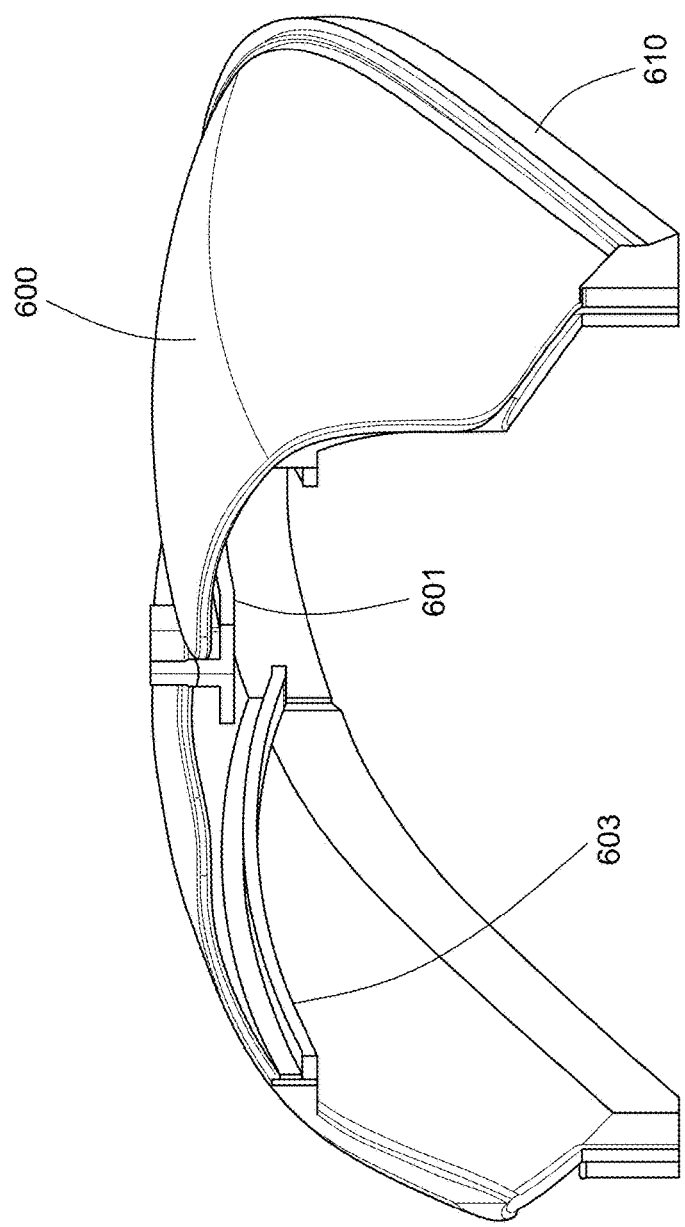
Figure 6E:
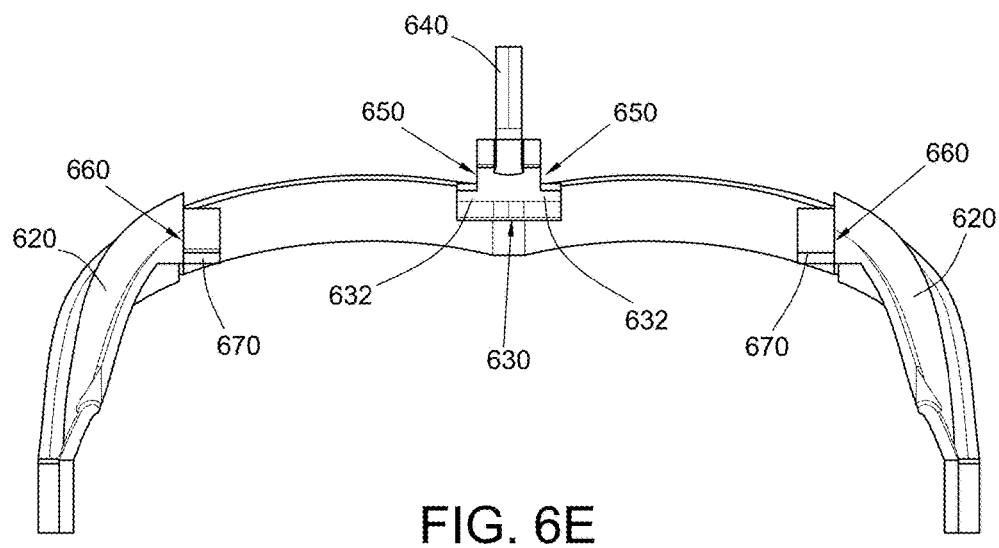
FIGS. 6E, 6F, 6G, and 6H show various perspective views of an example of masks and mechanical holder for deposition of films on a substrate to form a stereoscopic system.
Figure 6F:
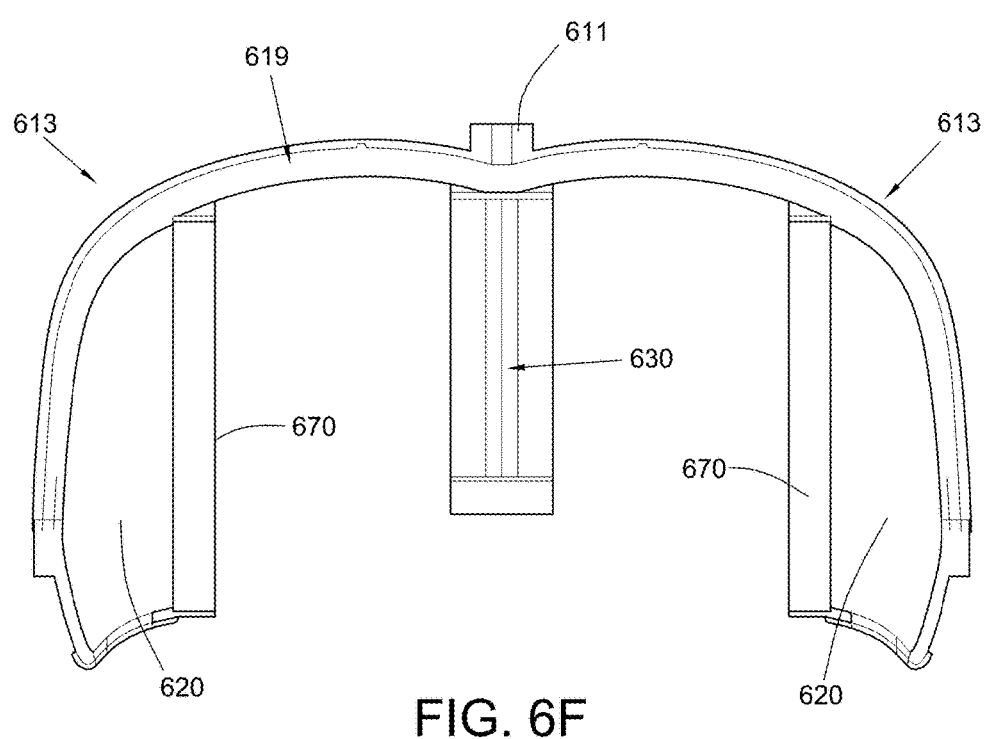
Figure 6G:
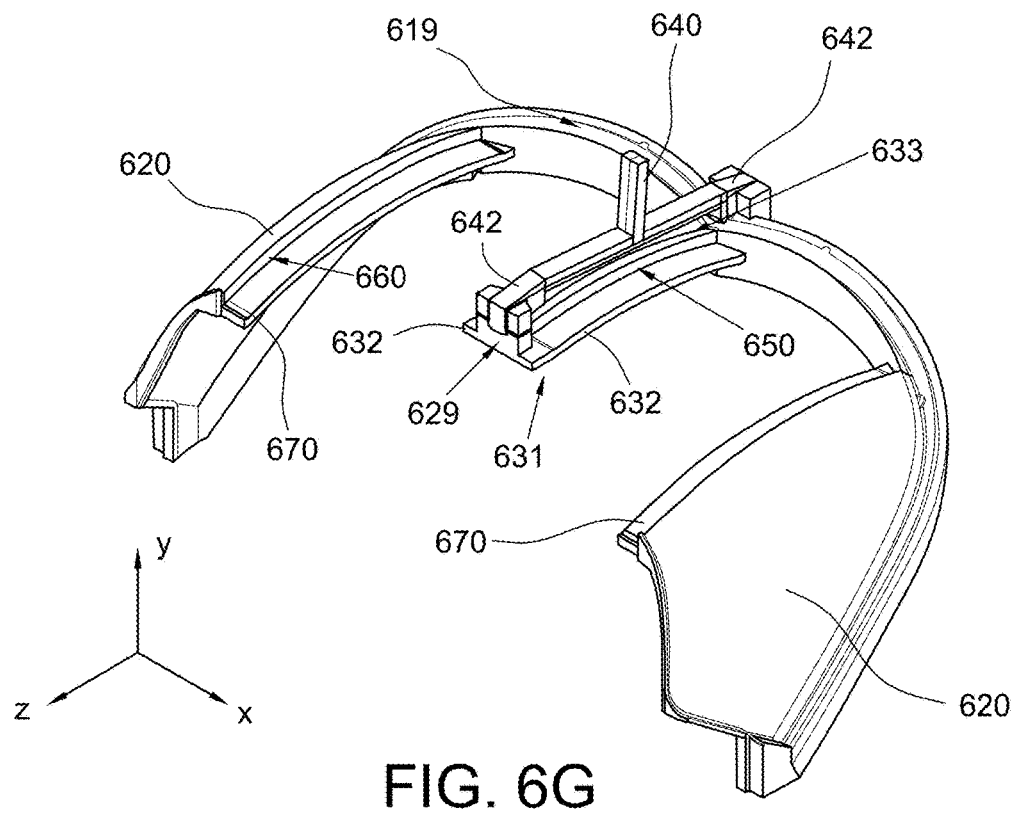
Figure 6H:
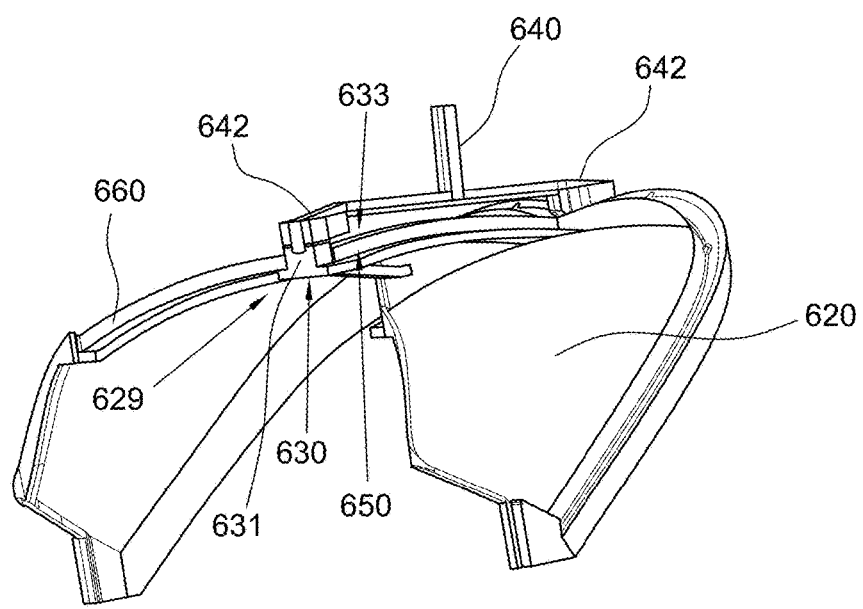

FIG. 5 shows one example of a gradient film profile based on the coating profile provided above for FIG. 4G. The gradient of the thin film coating provides a fading profile transitioning from complete coating to no coating. As shown, a complete R or SR coating is deposited or otherwise formed in two eye image regions 512. A gradient of the R or SR coating is provided from the edge of eye image regions into the nasal region. No coating is provided at a center portion of the nasal region. Similarly, a gradient of the R or SR coating is provided from the edge of the eye image regions into a portion of both temporal regions.

Two or more masks are used during deposition of the thin film coatings to the substrate of the combiner optics. In one example, the masks expose the eye image regions corresponding to the left and right eye during deposition of the SR coating while blocking evaporated material for the thin film SR coating from being deposited on the nasal region and the temporal regions just proximal to the eye image area. The masks are formed by a combination of a mechanical holder, which holds the combiner in place during the deposition process, and masks of certain portions of the combiner from thin film deposition. In order to create a gradient film, a mask may be offset from the combiner surface. For example, the offset mask is positioned at a distance d from the interior surface of the combiner by the mechanical holder that is used to mount and hold the combiner in the deposition chamber. The positioning of the offset mask relative to the combiner determines the gradient or fading profile of the deposited thin film coating. The distance d from the combiner surface or the offset is one factor in determining the gradient, and the surface area of the mask is another factor.

For example, the closer the mask is to the combiner surface the closer the transition is to a step change. As this distance of the mask from the surface of the substrate increases the slope of the gradient decreases. In one example, the spacing is chosen so that stray light is eliminated or suitably mitigated from the eye image areas, but the transition of the film between regions is not readily apparent when the exterior surface of combiner is viewed. In one example, the distance d is approximately 3 mm offset from the interior combiner surface; the width w of the offset mask for the nasal region is 7 mm.

The offset mask can be designed to be flat or curved, for example, to follow the contour of the interior surface so as to provide a uniform fading profile along the height of the visor. In one example, the mask material should be non-marring and should not outgas in a vacuum chamber so as to not introduce any visual defects to the surfaces of the combiner. In one example, the mask may be formed using Teflon.

FIGS. 6A, 6B, 6C, 6D, 6E, 6F, 6G, and 6H show examples of an optical substrate, gradient or offset masks, and substrate mechanical holder/mask combination or assembly that may be used to form the gradient profile of FIG. 4G and FIG. 5. Similar masks and arrangements in general can be used to form the coating profiles of FIGS. 4A, 4C, 4E, and 4G. In order to enable process flows for the coating profiles of FIGS. 4B, 4D, 4F, and 4H an inverse of the masks provided in FIG. 6 may be used (not shown) that, for example, blocks the eye image area when depositing the AR coating.

As shown in FIGS. 6A-6H as substrate 600 is placed on a mechanical holder 610. The mechanical holder 610 includes base member 611 forming two wings 613 generally radiating out from a central z axis. The wings 613 are shaped generally to correspond to the top edge of the substrate 600. The wings include a lip 619 on which the substrate 600 is seated. Extending from the base 611 at the outer portion of each wing are two temporal masks 620. The temporal masks 620 generally have a curvature matching the curvature of the interior surface of the substrate 600 in the temporal regions. The substrate 600 seats on both of the temporal masks 620 (in addition to the lip 619), which shield the substrate from the deposition of any film in the temporal regions. In addition to the temporal masks 620, the mechanical holder 610 also includes three different examples of offset masks that may be used in the thin film deposition process on the substrate 600 including: a first offset mask 601 for the nasal portion, and two offset masks 603 for the temporal portions.

The first offset mask 601 is formed by a central member 629, spine or rib that extends from the base member 611 generally along the central z axis (corresponding to the nasal portion of the substrate 600). In one example, the first offset mask 601 generally forms a T-shaped cross-section (e.g., in the y-x plane) having a flat portion 630 forming the top of the T and a center portion or rib 631 to offset or position the top surface area 630 of the mask 601 away from the interior surface of the substrate 600. The base of the T provides a surface 633 to seat the substrate 600 along the length of the center of the nasal region of the substrate 600. A T-shaped hanger member 640 snaps to, attaches, or otherwise mechanically engages the mechanical holder 610 at either end 642 of the center portion 631 to secure the substrate 600 with the mechanical holder 610 and to position the holder 610 and substrate 600 within the deposition chamber during the thin film deposition and/or coating process. The surface 633 of the base of the T cross section has a width $w_b$. In one example, the width $w_b$ of the base is 6 mm. The surface 633 runs along the interior surface of the substrate 600 and blocks the R or SR film from being deposited along the central axis of the nasal portion. The wall 650 of the mask extends at a right angel or orthogonally away from the substrate 600 to a height h. In one example, the height h is 3 mm. At the height h, the top portion of the T cross section includes wings or flanges 632 extend outward from the wall at roughly right angles to form the top surface 633 of the T cross section of the offset mask 601. In one example, the top surface 633 has a width $w_T$ of 20 mm. Generally, the mask 601 runs along the entire length of the nasal portion of the substrate 600. In one example, the mask 601 has a curvature mirroring the curvature of the interior surface of the nasal region of the substrate 600.

At the temporal region, the mechanical holder 610 positions the other two offset masks 603 relative to the temporal masks 620. The two temporal offset masks 603 are formed from strips having a width $w_s$, extending from the walls 660 of the temporal masks 620 that are offset from the surface of the substrate 600. The mask 603 and wall 660 form a generally L-shaped cross-section. The two temporal offset masks 603 are mirror images of each other. A base of the wall 660 is positioned along the interior surface of the substrate 600. As mentioned previously, the base of the temporal mask 620 blocks the R or SR film from being deposited along at least a portion of the temporal regions of the substrate 600. The wall 660 extends at a right angle or orthogonally away from the interior surface of the substrate to a height h to offset the mask from the interior surface. In one example, the height h is 3 mm. At the height h, a wing 670 or flange extends outward from the wall 660 at roughly a right angle. In one example, the wing 670 has a total width $w_w$ of 10 mm. Generally, the masks 603 run along the entire length of the height of the corresponding portion of substrate 600 having a curvature mirroring the curvature of the surface gradient portion of the temporal region.

Figure 7A:
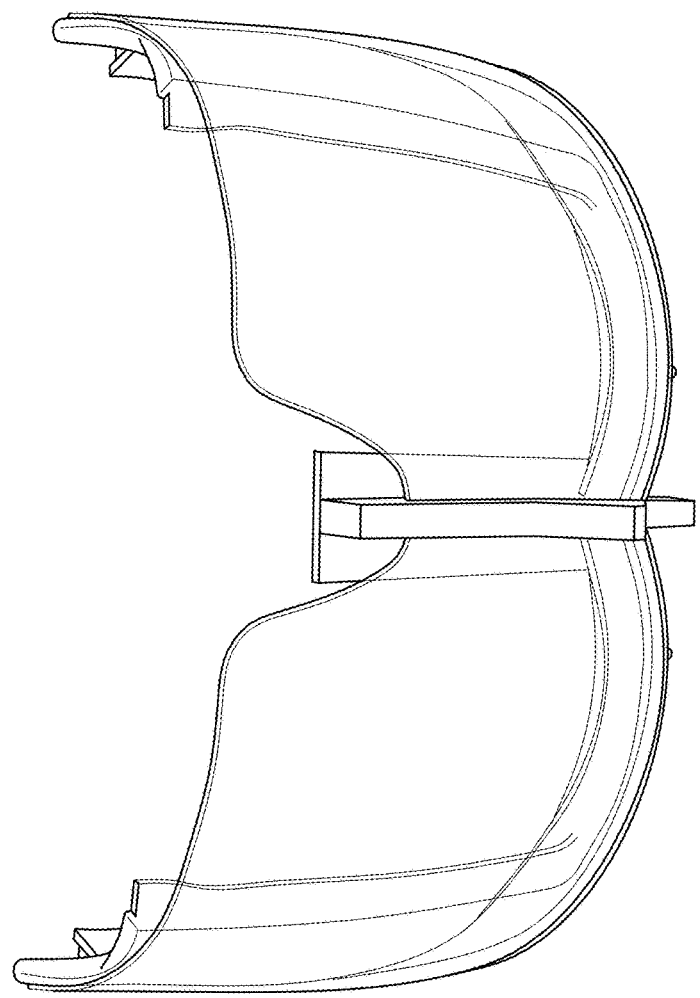

FIGS. 7A and 7B show photos of one example of the mechanical holder, combiner, and offset masks.

Figure 8A:
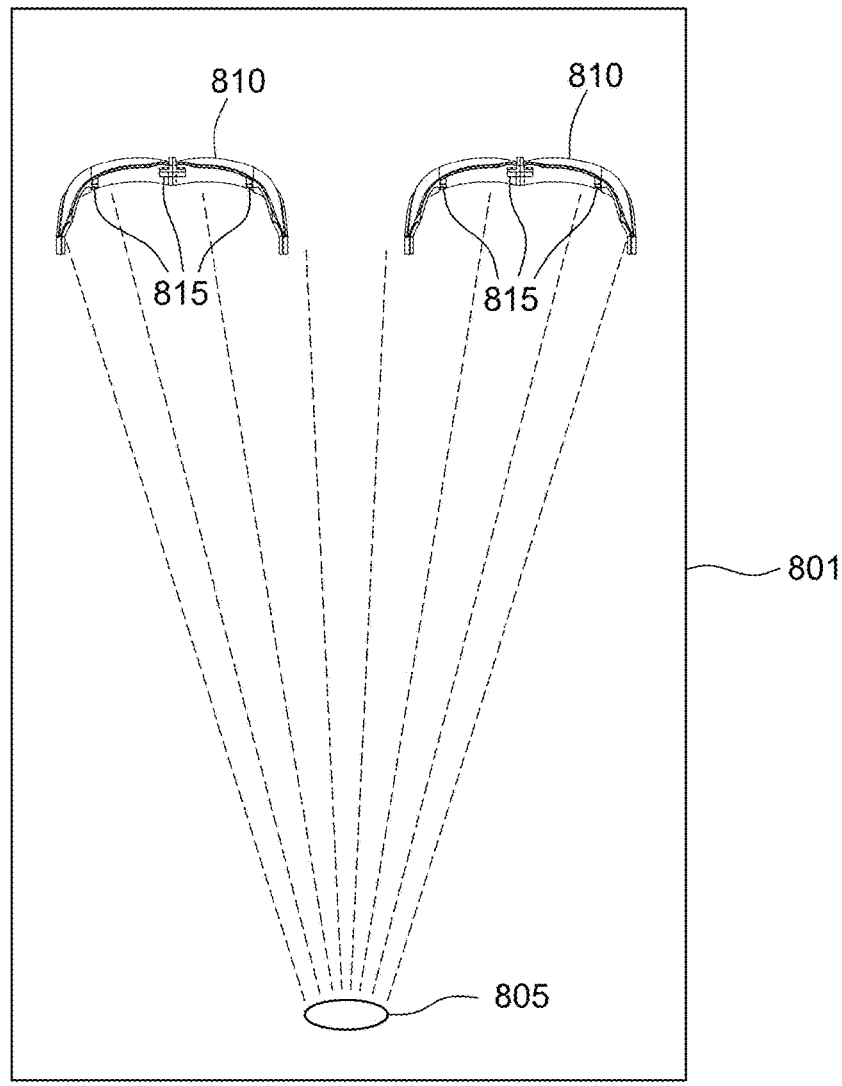
FIGS. 8A and 8B show an illustration of an example of a film deposition process.
Figure 8B:
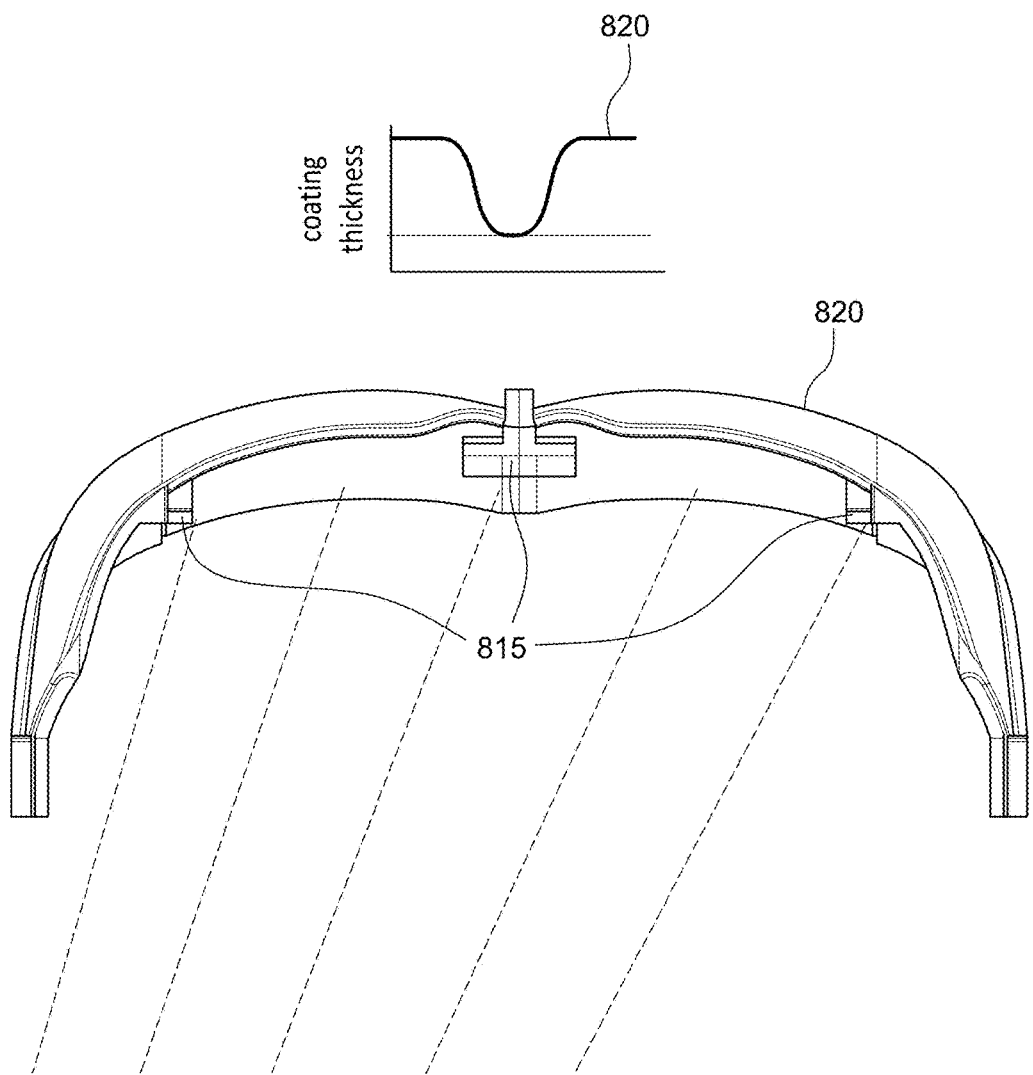

FIGS. 8A and 8B show an example of a deposition process for placing thin films on the substrate of the combiner. As shown in FIG. 8A, a deposition chamber 801 is provided. A source 805 of the thin film coating is place in the chamber 801. In this example, two combiners 810 with offset masks 815 and mechanical holder are positioned in the chamber 801 to coat the exposed portions of the combiner 810 (e.g., the eye image portions) deposit the thin film in the exposed portions. FIG. 8B shows a closer view of one of the combiners 810 and the offset masks 815. A deposition profile 820 showing the gradient and coating thickness is provided to show a corresponding thickness of the coating in the nasal region.

Figure 9B:
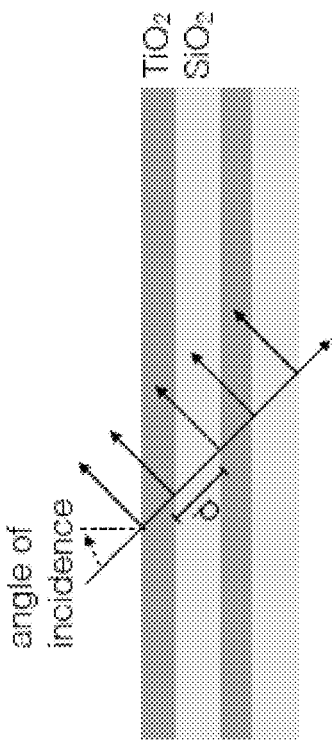
FIGS. 9A and 9B illustrate an example of optical coating design elements of a stereoscopic system.
Figure 9A:
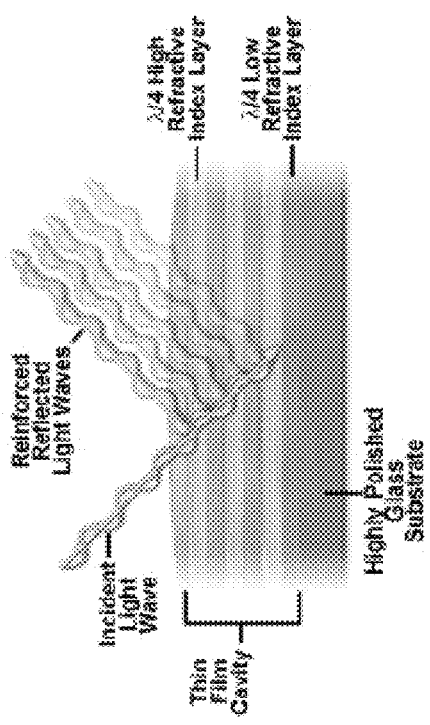

In one example, an SR coating is chosen to reflect 40%+/−5% of the light projected from a display over the visible spectrum over the eye image area or clear aperture, as shown in FIG. 9. The SR coating operates on the principle of Bragg reflection, where high and low index material thin-films are alternated to create layers of partially reflective mirrors, for example, as shown in FIG. 9. The thicknesses of these layers are constructed such that the optical path length (OPL) (OPL=n×d; where n=index of refraction and d=distance the light transverses) are equal, and are quarter wave plates (i.e., wavelength/4). When taken in conjunction with an 180° phase shift that occurs when going from a high to a low index material, this configuration gives rise to constructive interference. Partially reflected light coming from all layers is then in phase. In one example, coatings with TiO2 (n=2.61) and SiO2 (n=1.45) may be used.

Figure 10:
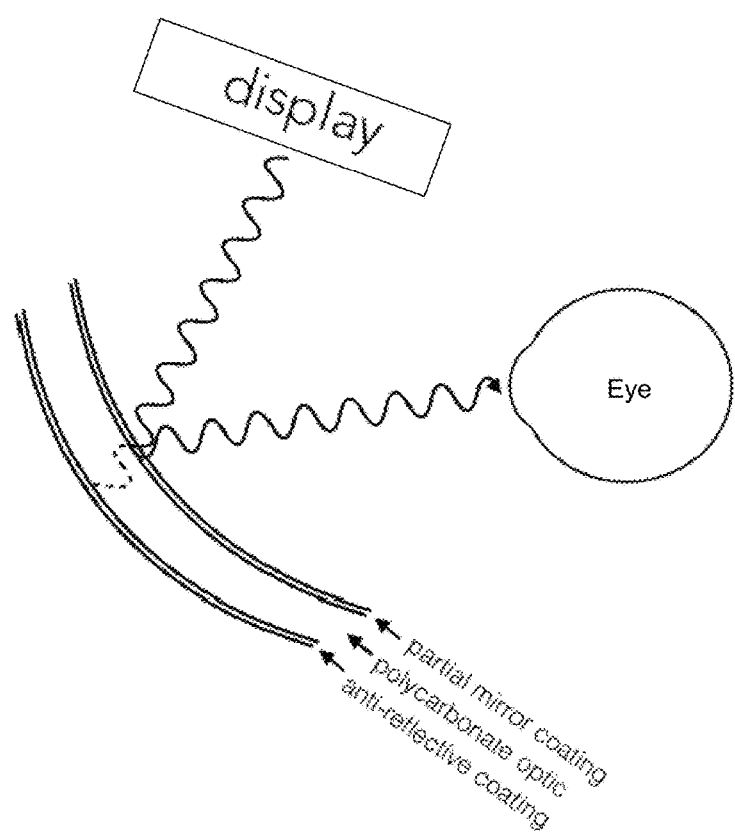
FIG. 10 illustrates the a cross-section showing concave interior surface to convex exterior surface of the combiner.
Figure 11:
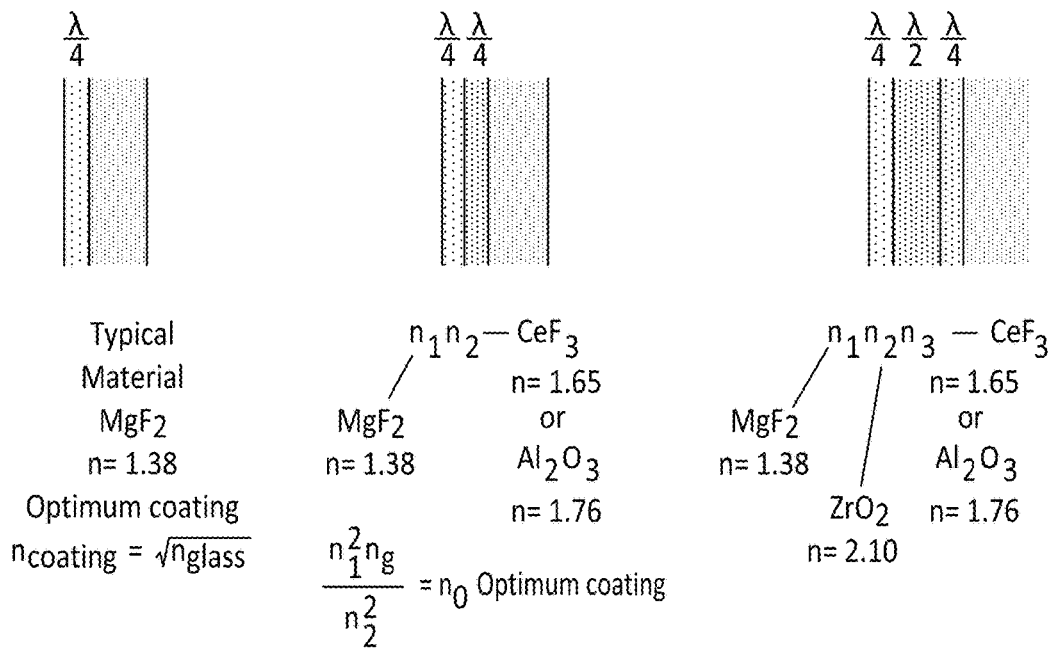
FIGS. 11 and 12 illustrate examples of film index and thickness chosen to provide destructive interference.
Figure 12:
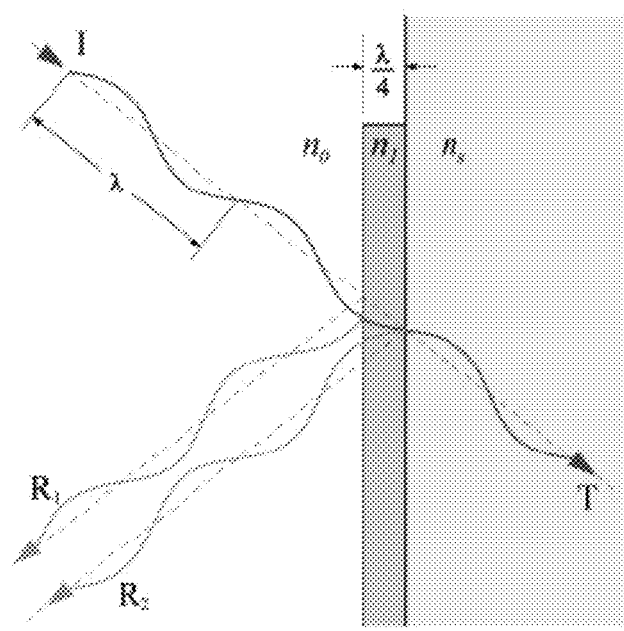

The convex portion of the combiner is coated with an anti-reflective (AR) coating. In some versions of the aforementioned approaches, this region is masked or exposed. An AR coating is chosen to reflect <1% of the light over the visible spectrum that leaks through from the concave interior surface to convex exterior surface of the combiner, as shown in FIG. 10. The AR coating also operates on the principle of Bragg reflection (as described above), where high and low index material thin-films are alternated. In the AR coating case, however, film index and thickness are chosen to provide destructive interference, as shown in FIGS. 11 and 12. In this case, the coating has an index of ni=sqrt($n_o n_s$). Also a quarter wavelength OPL but no phase shift and ($n_s > n_i > n_o$). This is analogous to impedance matching where T is maximized, and is only good for one wavelength. As a result, the coating extinguishes unwanted or stray light.

Examples of materials used for the AR coating are magnesium fluoride, silicon dioxide, zinc sulfide, and titanium dioxide.

Figure 13A:
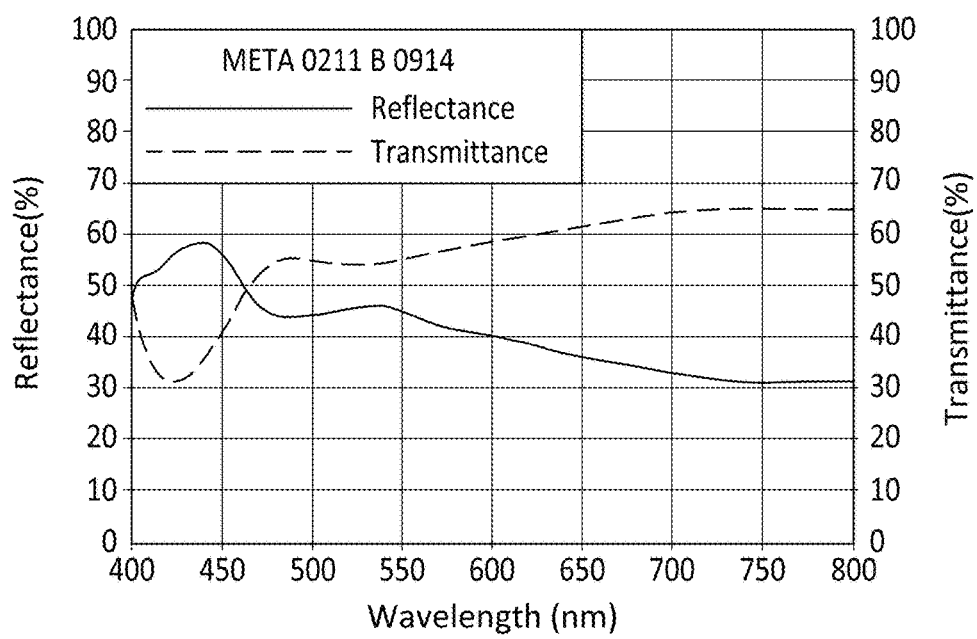
FIG. 13A shows a graph of an optical coating reflectance and transmission profile of a half-mirror coating.
Figure 13B:
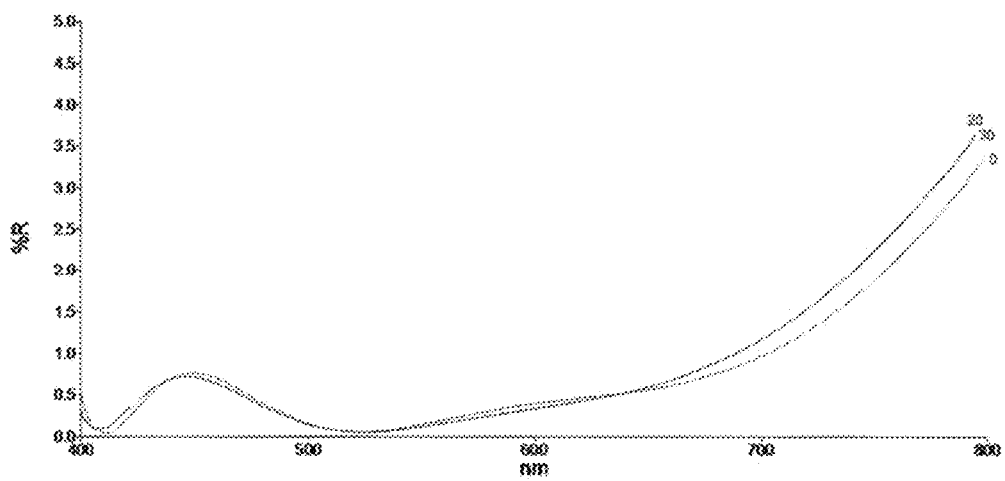
FIG. 13B shows a graph of an optical coating reflectance and transmission profile of an anti-reflective coating.

Spectral traces (reflectance and transmittance vs. wavelength) of the SR and AR coatings are shown in FIGS. 13A and 13B.

The coatings are deposited on combiners constructed from a polycarbonate substrate. Other examples possible substrates include acrylic, PMMA, or another polymeric lens material.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. An optics system of a head mounted stereoscopic vision system including at least one display system configured to display images to a user wearing the stereoscopic vision system, the optics system comprising:
   an optical visor including:
      a transparent or semitransparent substrate including an interior surface oriented facing the user and an exterior surface opposite the interior surface oriented facing a field of view of the user;
      an anti-reflective coating covering the interior surface of the substrate; and
      two eye image regions, each eye image region corresponding to one of the eyes of the user and formed by a separate and distinct area of semi-reflective or reflective coating formed on the anti-reflective coating;
      a nasal region corresponding to an area of the substrate between the two eye image regions;
      two temporal regions, each temporal region corresponding to an area of the substrate boarding one of the eye image regions opposite the nasal region;
      and four gradient regions formed by the semi-reflective or reflective coating including:
      two gradient regions extending from each eye image region into the nasal region and
      two gradient regions extending from each eye image region into a corresponding one of the temporal regions, wherein the thickness of the semi-reflective or reflective coating is substantially constant over the entire eye image regions and decreases at a gradient from a boundary of the eye image region through each gradient region to one of the nasal region and the corresponding temporal region and each eye image region is oriented to reflect light of a display image to the corresponding eye of the user.

2. The optics system of claim 1, wherein the substrate includes an upper edge, a lower edge, and each eye image region forming an area of the interior surface extending from the upper edge of the substrate to the lower edge of the substrate and further bounded by two opposite edges, one of the opposite edges at a border with the nasal region at the center of the visor and one of the opposite edges at a border with a corresponding temporal region.

3. The optics system of claim 2 wherein the four gradient regions formed by semi-reflective or reflective coating extend from the two opposite bounded edges of each eye image region including from a first bounded edge and extending into the nasal region and a second bounded edge and extending into the corresponding temporal region, wherein the thickness of the semi-reflective or reflective coating decreases at gradient from each of the first and second bounded edges through the gradient regions.

4. A method of making the optics system of claim 3 comprising:
   providing a mask offset from the interior surface of a substrate positioned by a holder relative to each edge of a boundary between the nasal region and each eye image region;
   placing the substrate in the holder;
   placing the holder, substrate and offset mask in a deposition chamber;
   placing a source of the semi-reflective or reflective coating for deposition onto the substrate in the deposition chamber; and
   forming the semi-reflective or reflective coating on the substrate.

5. The method of claim 4, further comprising:
   prior to placing the holder, substrate and mask in a deposition chamber; the providing a mask offset from the interior surface of the substrate positioned by the holder relative to the second bounded edge between a temporal region and each eye image region.

6. An optics system of a head mounted stereoscopic vision system including at least one display system configured to display images to a user wearing the stereoscopic vision system, the optics system comprising:
   an optical visor including:
      a transparent or semitransparent substrate including an interior surface oriented facing the user, and an exterior surface opposite the interior surface oriented facing a field of view of the user, the substrate including two temporal regions;
      a semi-reflective or reflective coating formed on a central region of the interior surface of the substrate beginning from a boundary of one temporal region and the central region and ending at a boundary of the other temporal region and the central region; and
      an anti-reflective coating formed on the semi-reflective or reflective coating covering a nasal region and dividing an interior surface of the semi-reflective or reflective coating into two separate and distinct exposed interior surface areas of semi-reflective or reflective coating corresponding to two eye image regions;
      two temporal regions, each temporal region corresponding to an area of the substrate bordering one of the eye image regions opposite the nasal region;
      two gradient regions formed by semi-reflective or reflective coating extending from a boundary of each eye image region into a corresponding one of the two temporal regions, wherein the thickness of the semi-reflective or reflective coating is substantially constant over the entire eye image regions and decreases at a gradient from the boundary of the eye image region through each gradient region to the corresponding temporal region and each eye image region is oriented to reflect light of a display image to a corresponding eye of the user.

7. The optics system of claim 6, wherein the substrate includes an upper edge and a lower edge, and each eye image region forming an area of the interior surface extending from the upper edge of the substrate to the lower edge of the substrate and further bounded by two opposite edges, one of the opposite edges at a border with the nasal region at the center of the visor and one of the opposite edges at a border with the corresponding temporal region.

8. The optics system of claim 6, wherein the two gradient regions formed by semi-reflective or reflective coating extend from an edge of each eye image region at a border with the corresponding temporal region extending into the temporal regions; and the thickness of the semi-reflective or reflective coating decreases at the gradient from each of the edges at the border with the corresponding temporal region through the gradient regions.

9. An optics system of a head mounted stereoscopic vision system including at least one display system configured to display images to a user wearing the stereoscopic vision system, the optics system comprising:
an optical visor including:
a transparent or semitransparent substrate including an interior surface oriented facing the user and an exterior surface opposite the interior surface oriented facing a field of view of the user;
two eye image regions, each eye image region corresponding to one of the eyes of the user and formed by a separate and distinct area of semi-reflective or reflective coating formed on the interior surface of the substrate;
a nasal region corresponding to an area of the substrate between the two eye image regions;
two temporal regions, each temporal region corresponding to an area of the substrate boarding one of the eye image regions opposite the nasal region;
and four gradient regions formed by the semi-reflective or reflective coating including:
two gradient regions extending from each eye image region into the nasal region and
two gradient regions extending from each eye image region into a corresponding one of the temporal regions, wherein the thickness of the semi-reflective or reflective coating is substantially constant over the entire eye image regions and decreases at a gradient from a boundary of the eye image region through each gradient region to one of the nasal region and the corresponding temporal region and each eye image region is oriented to reflect light of a display image to the corresponding eye of the user.

10. The optics system of claim 9, further comprising an antireflective coating formed on the interior surface of the substrate between the two eye image regions.

11. The optics system of claim 9, wherein the substrate includes an upper edge, a lower edge, each eye image region forming an area of the interior surface extending from the upper edge of the substrate to the lower edge of the substrate and further bounded by two opposite edges, one of the opposite edges at a border with the nasal region at the center of the visor and one of the opposite edges at a border with the corresponding temporal region.

12. The optics system of claim 11, wherein the four gradient regions are formed by the semi-reflective or reflective coating extending from the two opposite bounded edges of each eye image region including from a first bounded edge and extending into the nasal region and a second bounded edge and extending into the corresponding temporal region, wherein the thickness of the semi-reflective or reflective coating decreases at the gradient from each of the first and second bounded edges through the gradient regions.

13. A method of making the optics system of claim 12 comprising:
providing a mask offset from the interior surface of a substrate positioned by a holder relative to each edge of a boundary between the nasal region and each eye image region;
placing the substrate in the holder;
placing the holder, substrate and offset mask in a deposition chamber;
placing a source of the semi-reflective or reflective coating for deposition onto the substrate in the deposition chamber; and
forming the semi-reflective or reflective coating on the substrate.

14. The method of claim 13, further comprising:
prior to placing the holder, substrate and mask in a deposition chamber; the providing a mask offset from the interior surface of the substrate positioned by the holder relative to the second bounded edge between a temporal region and each eye image region.

15. An optics system of a head mounted stereoscopic vision system including at least one display system configured to display images to a user wearing the stereoscopic vision system, the optics system comprising:
an optical visor including:
a transparent or semitransparent substrate including an interior surface oriented facing the user, and an exterior surface opposite the interior surface oriented facing a field of view of the user, the substrate including two temporal regions;
a semi-reflective or reflective coating formed on a central region of the interior surface of the substrate beginning from a boundary of one temporal region and the central region and ending at a boundary of the other temporal region and the central region; and
an anti-reflective coating formed on the semi-reflective or reflective coating covering a nasal region and dividing an interior surface of the semi-reflective or reflective coating into two separate and distinct exposed interior surface areas of semi-reflective or reflective coating corresponding to two eye image regions; and
two gradient regions formed by semi-reflective or reflective coating extending from an edge of each eye image region at a border with a corresponding temporal region extending into the temporal regions, and the thickness of the semi-reflective or reflective coating is substantially constant over the entire eye image regions and decreases at a gradient from each of the edges at the border with the corresponding temporal region through the gradient regions and gradually increases at a gradient at a corresponding edge of the nasal region to a thickness a corresponding to the thickness of the anti-reflective coating formed on the semi-reflective or reflective coating covering the nasal region and each eye image region is oriented to reflect light of a display image to the corresponding eye of the user.

* * * * *